(12) United States Patent
Lee et al.

(10) Patent No.: US 10,705,612 B2
(45) Date of Patent: Jul. 7, 2020

(54) TACTILE STIMULUS PROVIDING APPARATUS

(71) Applicants: KOLON INDUSTRIES, INC., Gwacheon-si, Gyeonggi-do (KR); BHAPTICS CO., LTD., Daejeon (KR)

(72) Inventors: Hyun Soo Lee, Yongin-si (KR); Kiuk Gwak, Daejeon (KR)

(73) Assignees: KOLON INDUSTRIES, INC., Gwacheon-si (KR); BHAPTICS CO., LTD., Daejeon (KR)

( * ) Notice: Subject to any disclaimer, the term of this patent is extended or adjusted under 35 U.S.C. 154(b) by 0 days.

(21) Appl. No.: 15/778,770

(22) PCT Filed: Nov. 29, 2016

(86) PCT No.: PCT/KR2016/013885
§ 371 (c)(1),
(2) Date: May 24, 2018

(87) PCT Pub. No.: WO2017/099405
PCT Pub. Date: Jun. 15, 2017

(65) Prior Publication Data
US 2018/0348868 A1    Dec. 6, 2018

(30) Foreign Application Priority Data

Dec. 11, 2015  (KR) .................. 10-2015-0177093

(51) Int. Cl.
*G06F 3/00*     (2006.01)
*G06F 3/01*     (2006.01)
(Continued)

(52) U.S. Cl.
CPC ............... *G06F 3/016* (2013.01); *G06F 3/01* (2013.01); *G06F 3/011* (2013.01); *G06F 17/10* (2013.01);
(Continued)

(58) Field of Classification Search
CPC .......... G08B 6/00; G09G 5/34; G06F 1/1694; G06F 3/0416; G06F 3/014; G06F 3/0304; G06T 19/20
See application file for complete search history.

(56) References Cited

U.S. PATENT DOCUMENTS 7,639,232 B2    12/2009   Grant et al.
8,704,649 B2     4/2014   Ryu et al.
(Continued)

FOREIGN PATENT DOCUMENTS

KR    10-2008-0092482 A    10/2008
KR    10-2010-0089018 A     8/2010
(Continued)

OTHER PUBLICATIONS

European Patent Office; Communication dated May 27, 2019 in counterpart application No. 16873270.9.
(Continued)

*Primary Examiner* — Toan H Vu
(74) *Attorney, Agent, or Firm* — Sughrue Mion, PLLC (57) ABSTRACT

Disclosed is a tactile stimulation device including: a plurality of actuators; and a control unit controlling each of outputs of the plurality of actuators so as to create a tactile stimulus at a target position corresponding to a target site of a body of a user, in which the control unit creates the tactile stimulus by using first to third actuators corresponding to first to third vertexes of a triangle including the target position therein among the plurality of actuators.

20 Claims, 4 Drawing Sheets

(51) Int. Cl.
*G06F 17/10* (2006.01)
*H02P 25/032* (2016.01)
*H04M 19/04* (2006.01)

(52) U.S. Cl.
CPC ........ *H02P 25/032* (2016.02); *H04M 19/047* (2013.01)

(56) References Cited

U.S. PATENT DOCUMENTS

| | | | | |
|---|---|---|---|---|
| 2004/0236541 | A1* | 11/2004 | Kramer | G06T 19/20 703/1 |
| 2008/0088588 | A1* | 4/2008 | Kitaura | G06F 3/0304 345/158 |
| 2010/0238116 | A1 | 9/2010 | Shin | |
| 2011/0210931 | A1* | 9/2011 | Shai | G06F 3/014 345/173 |
| 2012/0194460 | A1 | 8/2012 | Kuwabara et al. | |
| 2013/0055150 | A1* | 2/2013 | Galor | G09G 5/34 715/784 |
| 2014/0160034 | A1 | 6/2014 | Da Costa et al. | |
| 2015/0339899 | A1* | 11/2015 | Ozaki | G08B 6/00 340/407.1 |
| 2016/0188181 | A1* | 6/2016 | Smith | G06F 3/0416 715/765 |
| 2016/0349790 | A1* | 12/2016 | Connor | G06F 1/1694 |

FOREIGN PATENT DOCUMENTS

KR 10-2010-0112977 A 10/2010
WO 2013/073912 A1 5/2013

OTHER PUBLICATIONS

International Search Report for PCT/KR2016/013885 dated Mar. 8, 2017 [PCT/ISA/210].

* cited by examiner

TACTILE STIMULUS PROVIDING APPARATUS

CROSS-REFERENCE TO RELATED APPLICATION

This application is a National Stage of International Application No. PCT/KR2016/013885, filed on Nov. 29, 2016, which claims priority to and the benefit of Korean Patent Application No. 10-2015-0177093 filed in the Korean Intellectual Property Office on Dec. 11, 2015, the entire contents of which are incorporated herein by reference.

TECHNICAL FIELD

The present invention relates to a tactile simulation device and a driving method thereof.

BACKGROUND ART

A tactile stimulation device includes a plurality of actuators and selectively vibrates the plurality of actuators to provide a tactile stimulus to a user. The tactile stimulation device generally generates a tactile stimulus by selecting and vibrating an actuator closest to a position where the tactile stimulus is to be generated.

However, in order to provide a more precise tactile stimulus to the user, a method for providing a virtual tactile stimulus at a midpoint using two actuators is proposed.

Figure 1:
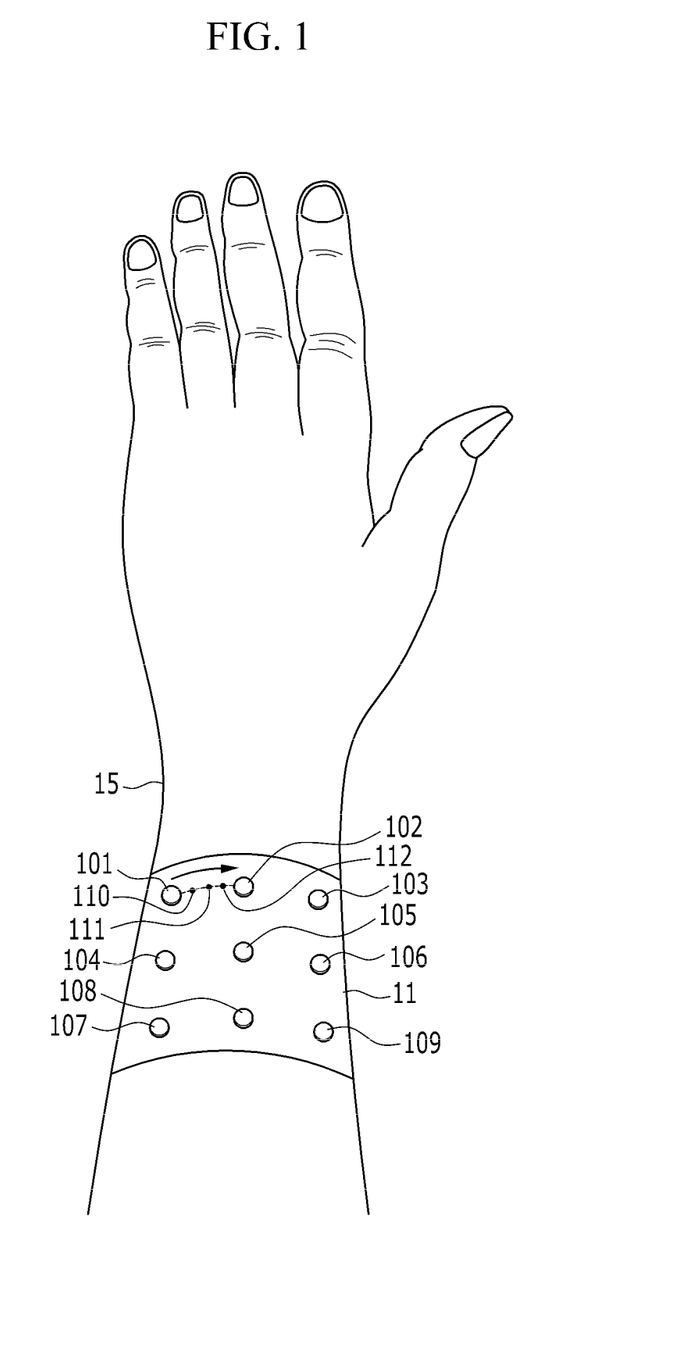
FIG. 1 is a view for explaining a tactile stimulation device for providing a virtual tactile stimulus in the related art.

FIG. 1 is a view for explaining a tactile stimulation device for providing a virtual tactile stimulus in the related art. Referring to FIG. 1, the tactile stimulation device includes a plurality of actuators 101, 102, 103, 104, 105, 106, 107, 108, and 109 arranged on a substrate 11 in a substantially matrix form.

When a body 15 such as a wrist of the user or the like is in contact with the tactile stimulation device, the tactile stimulation device may provide the virtual tactile stimulus which moves over time to the user from an actuator 101 to an actuator 102 using, for example, the actuators 101 and 102.

For example, when the tactile stimulation device intends to provide the tactile stimulus to the position of the actuator 101, the tactile stimulation device vibrates the actuator 101 with a set maximum magnitude and does not vibrate or vibrates the actuator 102 with a minimum magnitude. When the tactile stimulation device intends to provide the virtual tactile stimulus to a position 110, the tactile stimulant device vibrates the actuator 101 with a relatively large magnitude and vibrates the actuator 102 with a relatively small magnitude. When the tactile stimulation device intends to provide the virtual tactile stimulus to an intermediate position 111 between the actuator 101 and the actuator 102, the tactile stimulation device vibrates the actuator 101 and the actuator 102 with the same magnitude. When the tactile stimulation device intends to provide the virtual tactile stimulus to a position 112, the tactile stimulant device vibrates the actuator 101 with the relatively small magnitude and vibrates the actuator 102 with the relatively large magnitude. When the tactile stimulation device intends to provide the tactile stimulus to the position of the actuator 102, the tactile stimulation device vibrates only the actuator 102 with the set maximum magnitude and does not vibrate or vibrates the actuator 102 with the minimum magnitude.

The tactile stimulation device can provide the user with the virtual tactile stimulus moving between the two selected actuators by changing the magnitude of the vibration of the actuator corresponding to the position depending on the time as described above.

However, the tactile stimulation device of FIG. 1 provides only the virtual tactile stimulus on a one-dimensional line connecting the two selected actuators and fails to provide the virtual tactile stimulus on a two-dimensional plane.

DISCLOSURE

Technical Problem

The present invention has been made in an effort to provide a tactile stimulation device that can provide a virtual tactile on a two-dimensional plane to a user through a small number of calculations and a driving method thereof.

Technical Solution

An exemplary embodiment of the present invention provides a tactile stimulation device including: a plurality of actuators; and a control unit controlling each of outputs of the plurality of actuators so as to create a tactile stimulus at a target position corresponding to a target site of a body of a user, in which the control unit creates the tactile stimulus by using first to third actuators corresponding to first to third vertexes of a triangle including the target position therein among the plurality of actuators.

Herein, the control unit may set the target position as a first location, calculate the first location in a first triangle having the first to third vertexes as a second location in a second triangle having fourth to sixth vertexes corresponding to the first to third vertexes, and control the first to third actuators so as to create the tactile stimulus at the second location.

In addition, the control unit may determine a first output of the first actuator according to a fourth distance between the fourth vertex and the second location, determine a second output of the second actuator according to a fifth distance between the fifth vertex and the second location, and determine a third output of the third actuator according to a sixth distance between the sixth vertex and the second location.

Further, the first actuator may exist closest to the fourth vertex among the vertexes of the second triangle or exist in the fourth vertex, the second actuator may exist closest to the fifth vertex among the vertexes of the second triangle or exist in the fifth vertex, and the third actuator may exist closest to the sixth vertex among the vertexes of the second triangle or exist in the sixth vertex.

Herein, the second triangle may be a regular triangle, the first triangle may be a right-angled triangle, the first and second vertexes may be vertexes of both ends of an oblique side of the first triangle, respectively, and the third vertex may be a vertex at a right-angled portion of the first triangle. In addition, the fourth vertex may coincide with the first vertex, the fifth vertex may coincide with the second vertex, and the sixth vertex may exist in the vicinity of the third vertex. Further, the first to third actuators may be simultaneously driven to create the tactile stimulus at the second location.

In addition, when a coordinate of the first vertex is (x11, y11), the coordinate of the second vertex is (x12, y12), and the coordinate of the third vertex is (x13, y13), the coordinate of the fourth vertex is (x24, y24), the coordinate of the fifth vertex is (x25, y25), and the coordinate of the sixth vertex is (x26, y26), and the coordinate of the first location is (x1, y1), (x2, y2) which is the coordinate of the second location may be determined according to an equation below.

$$\begin{bmatrix} a \\ b \end{bmatrix} = \begin{bmatrix} x12-x11 & x13-x11 \\ y12-y11 & y13-y11 \end{bmatrix}^{-1} \begin{bmatrix} x1-x11 \\ y1-y11 \end{bmatrix},$$

$$\begin{bmatrix} x2-x24 \\ y2-y24 \end{bmatrix} = \begin{bmatrix} x25-x24 & x26-x24 \\ y25-y24 & y26-y24 \end{bmatrix} \begin{bmatrix} a \\ b \end{bmatrix},$$

Further, the first to third outputs may be determined linearly corresponding to the fourth to sixth distances, respectively. The control unit 22 may control the first actuator with a first pulse width modulation (PWM) signal having a first duty ratio corresponding to the first output, control the second actuator with a second PWM signal having a second duty ratio corresponding to the second output, and control the third actuator with a third PWM signal having a third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, and a reference distance is $d_{ref}$, $DR_1$ which is the first duty ratio is determined according to an equation below, $DR_1 = (d_{ref}-d4)*(DR_{max}-DR_{min})+DR_{min}$, $DR_2$ which is the second duty ratio may be determined according to an equation below, and, $DR_2=(d_{ref}-d5)*(DR_{max}-DR_{min})+DR_{min}$, $DR_3$ which is the third duty ratio may be determined according to an equation below. $DR_3=(d_{ref}-d6)*(DR_{max}-DR_{min})+DR_{min}$.

In addition, the first to third outputs may be determined logarithmically corresponding to the first to third distances, respectively. Specifically, the control unit may control the first actuator with the first pulse width modulation (PWM) signal having the first duty ratio corresponding to the first output, control the second actuator with the second PWM signal having the second duty ratio corresponding to the second output, and control the third actuator with the third PWM signal having the third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, the reference distance is $d_{ref}$, a first log scale factor is s1, and a second log scale factor is s2, dl1, dl2, and dl3 may be determined according to equations below, dl1=$(d_{ref}-d4)*(s2-s1)+s1$, dl2=$(d_{ref}-d5)*(s2-s1)+s1$, dl3=$(d_{ref}-d6)*(s2-s1)+s1$, $DR_1$ which is the first duty ratio may be determined according to an equation below, $$DR_1 = \frac{\log_{10}\frac{dl1}{s1}}{\log_{10}\frac{s2}{s1}} *(DR_{max} - DR_{min}) + DR_{min},$$

$DR_2$ which is the second duty ratio may be determined according to an equation below, and, $$DR_2 = \frac{\log_{10}\frac{dl2}{s1}}{\log_{10}\frac{s2}{s1}} *(DR_{max} - DR_{min}) + DR_{min},$$

$DR_3$ which is the third duty ratio may be determined according to an equation below.

$$DR_3 = \frac{\log_{10}\frac{dl3}{s1}}{\log_{10}\frac{s2}{s1}} *(DR_{max} - DR_{min}) + DR_{min}.$$

In addition, the control unit may determine a first output of the first actuator according to a first distance between the target position and the first vertex, determine a second output of the second actuator according to a second distance between the target position and the second vertex, and determine a third output of the third actuator according to a third distance between the target position and the third vertex. Herein, the first to third outputs may be determined to linearly correspond to the first to third distances, respectively Specifically, the control unit may control the first actuator with a first pulse width modulation (PWM) signal having a first duty ratio corresponding to the first output, control the second actuator with a second PWM signal having a second duty ratio corresponding to the second output, and control the third actuator with a third PWM signal having a third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, and a reference distance is $d_{ref}$, $DR_1$ which is the first duty ratio may be determined according to an equation below, $DR_1=(d_{ref}-d1)*(DR_{max}-DR_{min})+DR_{min}$ $DR_2$ which is the second duty ratio may be determined according to an equation below, and $DR_2=(d_{ref}-d2)*(DR_{max}-DR_{min})+DR_{min}$ $DR_3$ which is the third duty ratio may be determined according to an equation below.

$DR_3=(d_{ref}-d3)*(DR_{max}-DR_{min})+DR_{min}$

In addition, the first to third outputs may be determined to logarithmically correspond to the first to third distances, respectively. Herein, the control unit controls the first actuator with the first pulse width modulation (PWM) signal having the first duty ratio corresponding to the first output, controls the second actuator with the second PWM signal having the second duty ratio corresponding to the second output, and controls the third actuator with the third PWM signal having the third duty ratio corresponding to the third output fourth vertex coincides with the first vertex, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, the reference distance is $d_{ref}$, a first log scale factor is s1, and a second log scale factor is s2, dl1, dl2, and dl3 may be determined according to equations below, $dl1=(d_{ref}-d1)*(s2-s1)+s1$ $dl2=(d_{ref}-d2)*(s2-s1)+s1$ $dl3=(d_{ref}-d3)*(s2-s1)+s1$ $DR_1$ which is the first duty ratio may be determined according to an equation below, $$DR_1 = \frac{\log_{10}\frac{dl1}{s1}}{\log_{10}\frac{s2}{s1}} * (DR_{max} - DR_{min}) + DR_{min}$$

$DR_2$ which is the second duty ratio may be determined according to an equation below, and $$DR_2 = \frac{\log_{10}\frac{dl2}{s1}}{\log_{10}\frac{s2}{s1}} * (DR_{max} - DR_{min}) + DR_{min}$$

$DR_3$ which is the third duty ratio may be determined according to an equation $$DR_3 = \frac{\log_{10}\frac{dl3}{s1}}{\log_{10}\frac{s2}{s1}} * (DR_{max} - DR_{min}) + DR_{min}$$

below.

In addition, when the target position exists on any one side of the triangle, the control unit may create the tactile stimulus at the target position by driving two actuators included the one side among the first to third actuators. Further, the first to third actuators may be simultaneously driven to create the tactile stimulus at the target position.

Herein, the tactile stimulation device may further include a substrate in which the first to third actuators are disposed, in which the first to third actuators may be vibration motors and the first to third outputs may be vibration magnitudes.

Advantageous Effects

According to exemplary embodiments of the present invention, a tactile stimulation device and a driving method thereof can provide to a user a virtual tactile stimulus on a two-dimensional plane through a small number of operation times.

MODE FOR INVENTION

The present invention will be described more fully hereinafter with reference to the accompanying drawings, in which exemplary embodiments of the invention are shown.

The present invention may be implemented in various different forms and is not limited to exemplary embodiments described herein.

A part irrelevant to the description will be omitted to clearly describe the present invention, and the same elements will be designated by the same reference numerals throughout the specification. Therefore, the reference numeral described above may be used in another drawing.

Since the size and the thickness of each component illustrated in the drawings are arbitrarily represented for convenience in explanation, the present invention is not particularly limited to the illustrated size and thickness. the drawings, the thickness of layers, films, panels, regions, etc., are exaggerated for clarity. In addition, in the drawings, for understanding and ease of description, the thicknesses of some layers and areas are exaggerated.

Figure 2:
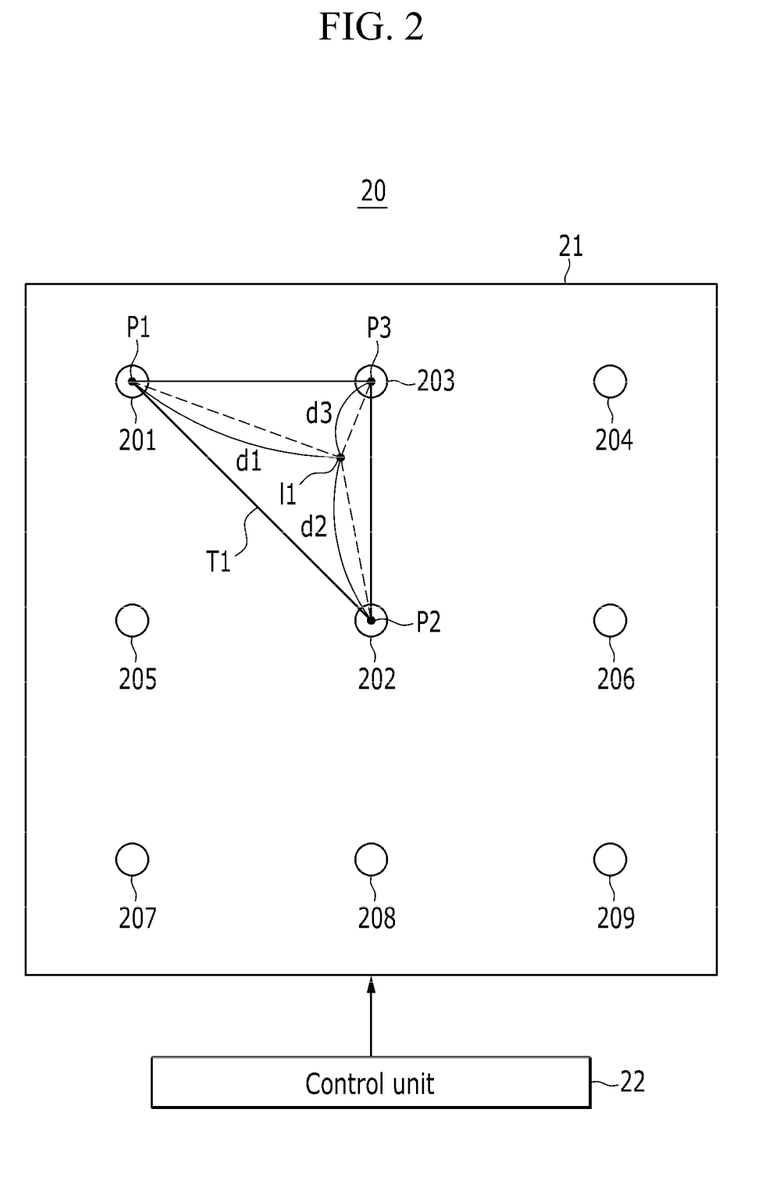
FIG. 2 is a diagram for describing a tactile simulation device and a driving method thereof according to an exemplary embodiment of the present invention.

FIG. 2 is a diagram for describing a tactile simulation device and a driving method thereof according to an exemplary embodiment of the present invention.

Referring to FIG. 2, a tactile simulation device 20 according to an exemplary embodiment includes a plurality of actuators 201, 202, 203, 204, 205, 206, 207, 208, and 209 and a control unit 22.

Hereinafter, it is described that the plurality of actuators 201, 202, 203, 204, 205, 206, 207, 208, and 209 is a vibration motor which is one of electric actuators as an example, but the plurality of actuators 201, 202, 203, 204, 205, 206, 207, 208, and 209 may be a pneumatic or hydraulic actuator. Accordingly, one type or a plurality of types of actuators may be applied to the present invention, and the type of actuator may not limit a scope of the present invention.

The plurality of actuators 201, 202, 203, 204, 205, 206, 207, 208, and 209 may be arranged on a substrate 21 in a matrix. The plurality of actuators 201, 202, 203, 204, 205, 206, 207, 208 and 209 is disposed on one surface of the substrate 21 and a body such as a wrist of a user may directly or indirectly contact the other surface of the substrate 21. Therefore, the plurality of actuators 201, 202, 203, 204, 205, 206, 207, 208, and 209 may transfer tactile feeling such as vibration to the user through the substrate 21. The substrate 21 may be configured to be in close contact with the body of the user and may include a flexible material In another exemplary embodiment, the substrate may include a plurality of grooves or openings, and the plurality of actuators may be located in grooves or openings corresponding thereto, respectively. Therefore, a form in which the plurality of actuators is disposed on the substrate may be varied and an arrangement form thereof may not limit the scope of the present invention. In yet another exemplary embodiment, the substrate may not be a plate and may be configured in a web form to connect each actuator. In this case, the actuator may directly or indirectly transfer the tactile feeling such as the vibration or the like to the body of the user without passing through the substrate. Therefore, a shape of the substrate itself and a form in which the substrate supports the plurality of actuators may be varied and the shape and the form may not limit the scope of the present invention.

The control unit 22 controls outputs of the plurality of actuators 201, 202, 203, 204, 205, 206, 207, 208, and 209 to generate a tactile stimulus at a target position corresponding to a target site of the body of the user. The control unit 22 may be a microcontroller and may control the outputs of the plurality of actuators 201, 202, 203, 204, 205, 206, 207, 208, and 209 using a pulse width modulation (PWM) signal, a sine wave signal, and the like.

In an exemplary embodiment, when the target position where the tactile stimulus is to be generated is a first location 11 in a first triangle T1 having a first actuator 201, a second actuator 202, and a third actuator 203 as a first vertex P1, a second vertex P2, and a third vertex P3, respectively, the control unit 22 may determine a first output of the first actuator 201 according to a first distance d1 between the first vertex P1 and the first location 11, determine a second output of the second actuator 202 according to a second distance d2 between the second vertex P2 and the first location 11, and determine a third output of the third actuator 203 according to a second distance d3 between the third vertex P3 and the first location 11. When the first to third actuators 201, 202, and 203 are vibration motors, the first to third outputs may be first to third vibration magnitudes.

In an exemplary embodiment, the control unit 22 may determine the first output of the first actuator 201 linearly corresponding to the first distance d1, determine the second output of the second actuator 202 linearly corresponding to the second distance d2, and determine the third output of the third actuator 203 linearly corresponding to the third distance d3.

For example, when the control unit 22 is the microcontroller that generates the PWM signal, the control unit 22 may control the first actuator 201 with a first PWM signal having a first duty ratio corresponding to the first output, control the second actuator 202 with a second PWM signal having a second duty ratio corresponding to the second output, and control the third actuator 203 with a third PWM signal having a third duty ratio corresponding to the third output.

The first to third duty ratios may be 0% or more and 100% or less. In the exemplary embodiment, the duty ratio corresponding to a minimum vibration magnitude at which the user may feel the tactile stimulus is set as a first reference duty ratio and the duty ratio corresponding to a maximum vibration magnitude at which the user may no longer feel a large tactile stimulus is set as a second reference duty ratio. The first reference duty ratio may have a value of 0% or more and the second reference duty ratio may have a value of 100% or less. The first reference duty ratio and the second reference duty ratio may be selected as appropriate values depending on a manufacturer and a product. Accordingly, the first to third duty ratios may be the first reference duty ratio or more and the second reference duty ratio or less.

In the exemplary embodiment, when the first reference duty ratio is $DR_{min}$, the second reference duty ratio is $DR_{max}$, and a reference distance is $d_{ref}$, $DR_1$ which is the first duty ratio may be determined according to Equation 1 below. Similarly, the second duty ratio $DR_2$ may be determined according to Equation 2 below and the third duty ratio $DR_3$ may be determined according to Equation 3 below.

$$DR_1=(d_{ref}-d1)*(DR_{max}-DR_{min})+DR_{min} \quad \text{[Equation 1]}$$

$$DR_2=(d_{ref}-d2)*(DR_{max}-DR_{min})+DR_{min} \quad \text{[Equation 2]}$$

$$DR_3=(d_{ref}-d3)*(DR_{max}-DR_{min})+DR_{min} \quad \text{[Equation 3]}$$

The reference distance $d_{ref}$ may be one of a maximum distance between a predetermined first location 11 and the first vertex P1 in the first triangle T1, the maximum distance between the first location 11 and the second vertex P2, and the maximum distance between the first location 11 and the third vertex P3. That is, the reference distance $d_{ref}$ may be a length of one side of the first triangle T1.

The larger the determined duty ratio, the larger the vibration magnitude of the corresponding actuator. The vibration magnitude of the actuator according to the duty ratio may vary depending on the manufacturer, the product, and a setting of the actuator. Referring to the exemplary embodiment of FIG. 2, a third vibration magnitude of the third actuator 203, which is relatively closest to the first location 11, may be larger than first and second vibration magnitudes of the first and second actuators 201 and 202.

The first to third actuators 201, 202, and 203 vibrate in respective positions P1, P2, and P3 in accordance with the above-mentioned equations, but the user feels the virtual tactile stimulus at the body site which is in direct or indirect contact with the first location 11. Therefore, according to the exemplary embodiment, the virtual tactile stimulus on a two-dimensional plane may be provided using three actuators. In the exemplary embodiment, the present invention is described by using three actuators which is the minimum number which may constitute the two-dimensional plane. However, those skilled in the art will be able to apply the present invention by using four or more actuators.

When the target position is present on any one side of the first triangle T1, the control unit 22 may generate the tactile stimulus at the target position by driving two actuators included in the one side among the plurality of actuators 201, 202, 203, 204, 205, 206, 207, 208, and 209. For example, when the target position is on a line connecting the second vertex P2 and the third vertex P3, the second actuator 202 and the third actuator 203 are driven to implement the virtual tactile stimulus. In such a case, the first actuator 201 may be in a stopped state in which the first actuator 201 is not driven.

When the target position is the first location 11 in the first triangle T1, the control unit 22 may simultaneously drive the first to third actuators 201, 202, and 203 so as to generate the tactile stimulation in the first location 11. In the exemplary embodiment, the virtual tactile stimulus is generated by driving the actuators so that the vibration magnitudes of the actuators are different in the same time period. In another exemplary embodiment, the actuators may be driven by time-dividing into different time periods or the plurality of actuators may be driven by overlapping some of the time periods.

Figure 3:
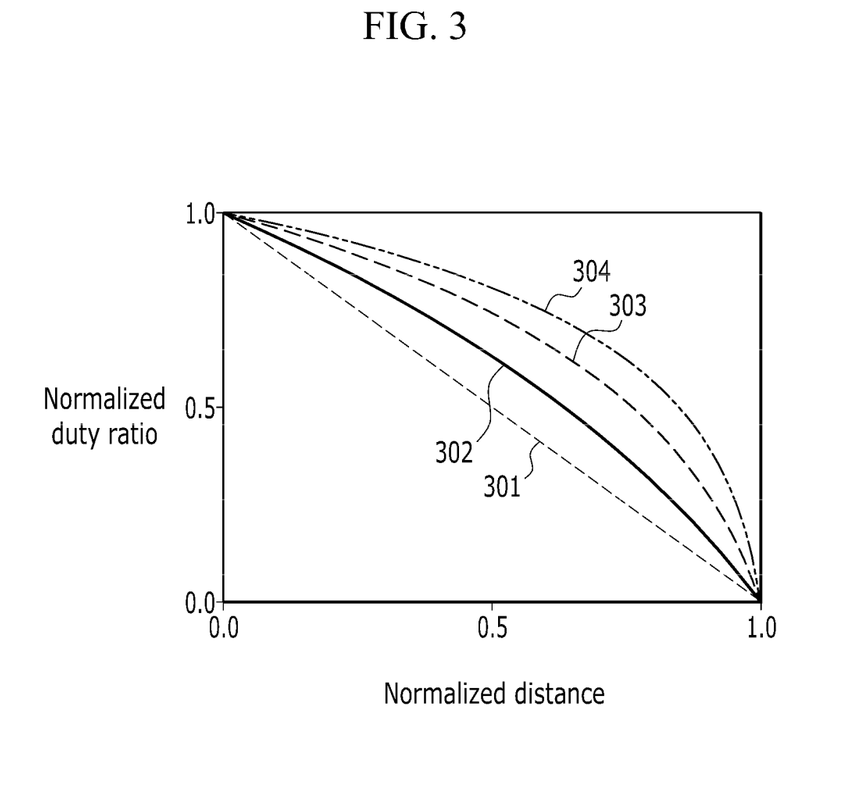
FIG. 3 is a diagram illustrating a normalized duty ratio to a normalized distance of an actuator.

FIG. 3 is a diagram illustrating a normalized duty ratio to a normalized distance of an actuator.

Referring to FIG. 3, the distance from the actuator to the first location 11 is normalized to be represented on a horizontal axis and the normalized duty ratio corresponding to the normalized distance is represented on a vertical axis. As the normalized distance is shorter, the first location 11 is closer to the actuator, so that the normalized duty ratio increases to increase the vibration magnitude.

A graph 301 represents a case where the normalized distance and the normalized duty ratio linearly correspond to each other and corresponds to the exemplary embodiment of FIG. 2 described above.

Graphs 302, 303, and 304 illustrate a case where the normalized distance and the normalized duty ratio correspond to each other logarithmically and in this case, the magnitude of the tactile stimulation felt by a person may be constant when the virtual tactile stimulation moves from one location to another location as compared with the graph 301.

Hereinafter, a process of determining the first to third outputs logarithmically corresponding to the first to third distances d1, d2, and d3, respectively will be described with the exception of a part described with reference to FIG. 2 for easy description.

Slopes of the graphs 302, 303, and 304 may be determined by a first log scale factor and a second log scale factor. For example, the first log scale factor of the graph 302 may be 1 and the second log scale factor may be 3, the first log scale factor of the graph 303 is 1 and the second log scale factor may be 10, and the first log scale factor of the graph 304 may be 1 and the second log scale factor may be 30. The first and second log scale factors may be determined differently according to the manufacturer and the product.

When the first reference duty ratio is $DR_{min}$, the second reference duty ratio is $DR_{max}$, the first distance is d1, the second distance is d2, the third distance is d3, the reference distance is $d_{ref}$, the first log scale factor is s1, and the second log scale factor is s2, dl1 may be determined according to Equation 4 below, dl2 may be determined according to Equation 5 below, and dl3 may be determined according to Equation 6 below. In this case, s2 may be a value larger than s1.

$$dl1=(d_{ref}-d1)*(s2-s1)+s1 \quad \text{[Equation 4]}$$

$$dl2=(d_{ref}-d2)*(s2-s1)+s1 \quad \text{[Equation 5]}$$

$$dl3=(d_{ref}-d3)*(s2-s1)+s1 \quad \text{[Equation 6]}$$

$DR_1$, which is the first duty ratio, may be determined according to Equation 7 below, $DR_2$, which is the second duty ratio, may be determined according to Equation 8 below, and $DR_3$, which is the third duty ratio, may be determined according to Equation 9 below.

$$DR_1 = \frac{\log_{10}\frac{dl1}{s1}}{\log_{10}\frac{s2}{s1}} * (DR_{max}-DR_{min}) + DR_{min} \quad \text{[Equation 7]}$$

$$DR_2 = \frac{\log_{10}\frac{dl2}{s1}}{\log_{10}\frac{s2}{s1}} * (DR_{max}-DR_{min}) + DR_{min} \quad \text{[Equation 8]}$$

$$DR_3 = \frac{\log_{10}\frac{dl3}{s1}}{\log_{10}\frac{s2}{s1}} * (DR_{max}-DR_{min}) + DR_{min} \quad \text{[Equation 9]}$$

The first to third actuators 201, 202, and 203 vibrate in respective positions P1, P2, and P3 in accordance with the above-mentioned equations, but the user feels the virtual tactile stimulus at the body site which is in direct or indirect contact with the first location 11. Therefore, according to the exemplary embodiment, the virtual tactile stimulus on a two-dimensional plane may be provided using three actuators. Further, when compared with the case where the first to third outputs are determined linearly corresponding to the first to third distances d1, d2, and d3, respectively, the magnitude of the tactile stimulus that the user feels may be constant when the virtual tactile stimulus moves from one position to another position. In the exemplary embodiment, the present invention is described by using three actuators which is the minimum number constituting the two-dimensional plane. However, those skilled in the art will be able to apply the present invention to four or more actuators.

Figure 4:
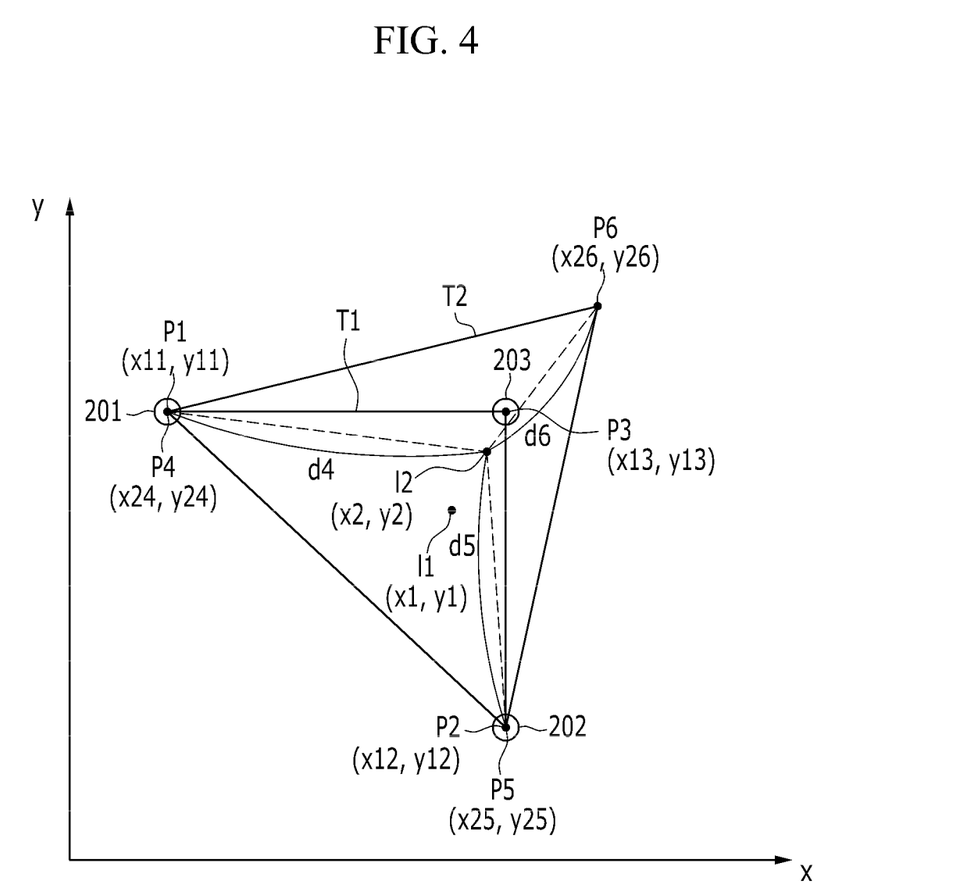
FIG. 4 is a diagram for describing a driving method of a tactile stimulation device according to an exemplary embodiment of the present invention.

FIG. 4 is a diagram for describing a driving method of a tactile stimulation device according to an exemplary embodiment of the present invention.

In the exemplary embodiment of FIG. 4, the driving method of the tactile stimulation device will be described by using the tactile stimulation device 20 of FIG. 2. In FIG. 4, the first actuator 201, the second actuator 202, and the third actuator 203 required for the description among the components of the tactile stimulation device 20 are enlarged and illustrated.

Referring back to the exemplary embodiment of FIG. 2 for comparison with the exemplary embodiment of FIG. 4, the first triangle T1 has a right-angle triangular shape. Therefore, as described above, when the reference distance $d_{ref}$ is one of the sides of the first triangle T1, exception handling by the control unit 22 is required.

For example, when the reference distance $d_{ref}$ is selected as the distance between the first vertex P1 and the third vertex P3, in Equations 1 and 2, the reference distance $d_{ref}$ may be smaller than the first distance d1 or the second distance d2. In this case, since the first duty ratio $DR_1$ or the second duty ratio $DR_2$ may be negative, the exception handling needs to be performed so as not to be negative. Additional operations according to the exception handling are required to express the vibration magnitude corresponding to the first distance d1 or the second distance d2 exceeding the reference distance $d_{ref}$.

In another example, when the reference distance $d_{ref}$ is selected as the distance between the first vertex P1 and the second vertex P2, the reference distance $d_{ref}$ is always larger than the third distance d3 in Equation 3. That is, the third duty ratio $DR_3$ may not be reduced to the first reference duty ratio $DR_{min}$ and therefore, the vibration magnitude that may be expressed is limited. In order to express this, the additional operations according to exception handling are needed.

Therefore, an algorithm for minimizing the additional operations in the exemplary embodiment of FIG. 4 will be described below.

In the exemplary embodiment of FIG. 4, when the target position is the first location 11 in the first triangle T1 having the first, second, and third actuators 201, 202, and 203 as the first, second, and third vertexes P1, P2, and P3, respectively, the control unit 22 coordinate-calculates the second triangle T2 and the second location 12 in the second triangle T2 corresponding to the first triangle T1 and the first location 11, respectively and controls the first, second, and third actuators 201, 202, and 203 so as to generate the tactile stimulus at the second location 12. In this case, the second triangle T2 includes a fourth vertex P4 corresponding to the first vertex P1, a fifth vertex P5 corresponding to the second vertex P2, and a sixth vertex P6 corresponding to the third vertex P3.

According to the exemplary embodiment, since the control unit 22 calculates the first to third outputs of the first to third actuators 201, 202, and 203 after coordinate-converting the first triangle T1, which is not a regular triangle, to the second triangle T2, which is a regular triangle, it is advantageous in that the exemplary embodiment is the same as the exemplary embodiment of FIG. 2 even though the reference distance $d_{ref}$ is based on any one side of the second triangle T2, and as a result, the additional operations depending on the exception handling are not required unlike the exemplary embodiment of FIG. 2.

the exemplary embodiment, the first triangle T1 is the right-angled triangle and the first vertex P1 and the second vertex P2 are positioned at coordinates (x11, y11) and (x12, y12) of both ends of the oblique of the first triangle T1, respectively. The third vertex P3 is located at (x13, y13), which is an orthogonal part vertex coordinate of the first triangle T1. The second triangle T2 is the regular triangle, the fourth vertex P4 is located at a coordinate (x24, y24), the fifth vertex P5 is located at a coordinate (x25, y25), and the sixth vertex P6 is located at a coordinate (x26, y26).

As illustrated in FIG. 4, in the exemplary embodiment, the fourth vertex P4 is located at the same position as the first vertex P1, the fifth vertex P5 is at the same position as the second vertex P2, and the sixth vertex P6 exists in the vicinity of the third vertex P3. That is, the second triangle T2, which is the regular triangle, is coordinate-converted based on the side connecting the first vertex P1 and the second vertex P2. Such coordinate conversion is one exemplary embodiment and as another exemplary embodiment, the first triangle T1 may be coordinate-converted into the second triangle T2 based on the side connecting the first vertex P1 and the third vertex P3. In this case, the fifth vertex P5 will be located at a different position from the second vertex P2. As yet another exemplary embodiment, the second triangle T2 may be coordinate-converted with a length of an independent side without reference to either side of the first triangle T1. Therefore, a method of coordinate-conversion from the first triangle T1 to the second triangle T2 may be very diverse and the scope of the present invention may not be limited by a specific coordinate conversion method.

As an exemplary embodiment, an equation in which the coordinate conversion from the first triangle T1 to the second triangle T2 is as follows. With reference to Equations 10 and 11 below, it can be seen that the coordinates of the three vertices P1, P2, and P3 of the first triangle T1 and the coordinates of the three vertices P4, P5, and P6 of the second triangle T2 may be arbitrarily determined and the shape of the triangle is not limited.

In Equations 10 and 11 below, since the coordinate (x11, y11) of the first vertex P1, the coordinate (x12, y12) of the second vertex P2, the coordinate (x13, y13) of the third vertex P3, the coordinate (x24, y24) of the fourth vertex P4, the coordinate (x25, y25) of the fifth vertex P5, the coordinate (x26, y26) of the sixth vertex P6, and the coordinate (x1, y1) of the first location l1 are determined in advance, it is possible to derive a variable a, a variable b, and the coordinate (x2, y2) of the second location l2.

$$\begin{bmatrix} a \\ b \end{bmatrix} = \begin{bmatrix} x12-x11 & x13-x11 \\ y12-y11 & y13-y11 \end{bmatrix}^{-1} \begin{bmatrix} x1-x11 \\ y1-y11 \end{bmatrix} \quad \text{[Equation 10]}$$

$$\begin{bmatrix} x2-x24 \\ y2-y24 \end{bmatrix} = \begin{bmatrix} x25-x24 & x26-x24 \\ y25-y24 & y26-y24 \end{bmatrix} \begin{bmatrix} a \\ b \end{bmatrix} \quad \text{[Equation 11]}$$

The control unit 22 determines the first output of the first actuator 201 in accordance with the calculated fourth distance d4 between the second location l2 and the fourth vertex P4, determines the second output of the second actuator 202 in accordance with the fifth distance d5 between the fifth vertex P5 and the second location l2, and determines the third output of the third actuator 203 in accordance with the sixth distance d6 between the sixth vertex P6 and the second location l2. When the first to third actuators 201, 202, and 203 are the vibration motors, the first to third outputs are the first to third vibration magnitudes.

In an exemplary embodiment, the first to third outputs may be determined corresponding linearly to the fourth to sixth distances d4, d5, and d6, respectively.

When the first reference duty ratio is $DR_{min}$, the second reference duty ratio is $DR_{max}$, the fourth distance is d4, the fifth distance is d5, the sixth distance is d6, and the reference distance is $d_{ref}$, DR1, which is the first duty ratio input into the first actuator 201, may be determined according to Equation 12 below. Similarly, the second duty ratio $DR_2$ input into the second actuator 202 may be determined according to Equation 13 below and the third duty ratio $DR_3$ input into the third actuator 203 may be determined according to Equation 14 below.

$$DR_1=(d_{ref}-d4)*(DR_{max}-DR_{min})+DR_{min} \quad \text{[Equation 12]}$$

$$DR_2=(d_{ref}-d5)*(DR_{max}-DR_{min})+DR_{min} \quad \text{[Equation 13]}$$

$$DR_3=(d_{ref}-d6)*(DR_{max}-DR_{min})+DR_{min} \quad \text{[Equation 14]}$$

In another exemplary embodiment, the first to third outputs may be determined logarithmically corresponding to the fourth to sixth distances d4, d5, and d6, respectively.

When the first reference duty ratio is $DR_{min}$, the second reference duty ratio is $DR_{max}$, the fourth distance is d4, the fifth distance is d5, the sixth distance is d6, the reference distance is $d_{ref}$, the first log scale factor is s1, and the second log scale factor is s2, dl1, dl2, and dl3 may be determined according to Equations 15, 16, and 17 below. In this case, s2 may be a value larger than s1.

$$dl1=(d_{ref}-d4)*(s2-s1)+s1 \quad \text{[Equation 15]}$$

$$dl2=(d_{ref}-d5)*(s2-s1)+s1 \quad \text{[Equation 16]}$$

$$dl3=(d_{ref}-d6)*(s2-s1)+s1 \quad \text{[Equation 17]}$$

In this case, the first duty ratio $DR_1$ input into the first actuator 201 may be determined according to Equation 18 below. Similarly, the second duty ratio $DR_2$ input into the second actuator 202 may be determined according to Equation 19 below and the third duty ratio $DR_3$ input into the third actuator 203 may be determined according to Equation 20 below.

$$DR_1 = \frac{\log_{10}\frac{dl1}{s1}}{\log_{10}\frac{s2}{s1}} * (DR_{max}-DR_{min}) + DR_{min} \quad \text{[Equation 18]}$$

$$DR_2 = \frac{\log_{10}\frac{dl2}{s1}}{\log_{10}\frac{s2}{s1}} * (DR_{max}-DR_{min}) + DR_{min} \quad \text{[Equation 19]}$$

$$DR_3 = \frac{\log_{10}\frac{dl3}{s1}}{\log_{10}\frac{s2}{s1}} * (DR_{max}-DR_{min}) + DR_{min} \quad \text{[Equation 20]}$$

Although the method of generating the virtual tactile stimulus at a specific location such as the first location l1 or the second location l2 has been described in the present invention up to now, the first location l1 or the second location l2 is varied gradually over time, and as a result, the user may experience the movement of the virtual tactile stimulus rather than the specific location. Alternatively, a new tactile experience may be provided to the user by simultaneously creating or moving the virtual tactile stimulus at a plurality of locations rather than at a single location. Therefore, the present invention may be applied to various virtual tactile stimulation creation algorithms and the scope of the present invention may not be limited by the above-described exemplary embodiments.

The invention claimed is:

1. A tactile stimulation device comprising:
   a substrate;
   a plurality of actuators arranged on the substrate; and a control unit controlling each of outputs of the plurality of actuators so as to create a tactile stimulus at a target position corresponding to a target site of a body of a user;

wherein the control unit creates the tactile stimulus by using first to third actuators corresponding to first to third vertexes of a triangle including the target position therein among the plurality of actuators, wherein the control unit sets the target position as a first location, calculates the first location in a first triangle having the first to third vertexes as a second location in a second triangle having fourth to sixth vertexes corresponding to the first to third vertexes, and controls the first to third actuators so as to create the tactile stimulus at the second location.

2. The tactile stimulation device of claim 1, wherein:
the control unit determines a first output of the first actuator according to a fourth distance between the fourth vertex and the second location, determines a second output of the second actuator according to a fifth distance between the fifth vertex and the second location, and determines a third output of the third actuator according to a sixth distance between the sixth vertex and the second location.

3. The tactile stimulation device of claim 1, wherein:
the first actuator exists closest to the fourth vertex among the vertexes of the second triangle or exists in the fourth vertex,
the second actuator exists closest to the fifth vertex among the vertexes of the second triangle or exists in the fifth vertex, and
the third actuator exists closest to the sixth vertex among the vertexes of the second triangle or exists in the sixth vertex.

4. The tactile stimulation device of claim 3, wherein:
the second triangle is a regular triangle.

5. The tactile stimulation device of claim 3, wherein:
the first triangle is a right-angled triangle,
the first and second vertexes are vertexes of both ends of an oblique side of the first triangle, respectively, and
the third vertex is a vertex at a right-angled portion of the first triangle.

6. The tactile stimulation device of claim 5, wherein:
the fourth vertex coincides with the first vertex,
the fifth vertex coincides with the second vertex, and
the sixth vertex exists in the vicinity of the third vertex.

7. The tactile stimulation device of claim 1, wherein:
the first to third actuators are simultaneously driven to create the tactile stimulus at the second location.

8. The tactile stimulation device of claim 1, wherein:
when a coordinate of the first vertex is (x11, y11), the coordinate of the second vertex is (x12, y12), and the coordinate of the third vertex is (x13, y13),
the coordinate of the fourth vertex is (x24, y24), the coordinate of the fifth vertex is (x25, y25), and the coordinate of the sixth vertex is (x26, y26), and
the coordinate of the first location is (x1, y1),
(x2, y2) which is the coordinate of the second location is determined according to an equation below $$\begin{bmatrix} a \\ b \end{bmatrix} = \begin{bmatrix} x12-x11 & x13-x11 \\ y12-y11 & y13-y11 \end{bmatrix}^{-1} \begin{bmatrix} x1-x11 \\ y1-y11 \end{bmatrix}$$

-continued $$\begin{bmatrix} x2-x24 \\ y2-y24 \end{bmatrix} = \begin{bmatrix} x25-x24 & x26-x24 \\ y25-y24 & y26-y24 \end{bmatrix} \begin{bmatrix} a \\ b \end{bmatrix}.$$

9. The tactile stimulation device of claim 2, wherein:
the first to third outputs are determined linearly corresponding to the fourth to sixth distances, respectively.

10. The tactile stimulation device of claim 9, wherein:
the control unit controls the first actuator with a first pulse width modulation (PWM) signal having a first duty ratio corresponding to the first output, controls the second actuator with a second PWM signal having a second duty ratio corresponding to the second output, and controls the third actuator with a third PWM signal having a third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, and a reference distance is $d_{ref}$, $DR_1$ which is the first duty ratio is determined according to an equation below, $DR_1 = (d_{ref} - d4)*(DR_{max} - DR_{min}) + DR_{min}$ $DR_2$ which is the second duty ratio is determined according to an equation below, and $DR_2 = (d_{ref} - d5)*(DR_{max} - DR_{min}) + DR_{min}$ $DR_3$ which is the third duty ratio is determined according to an equation below $DR_3 = (d_{ref} - d6)*(DR_{max} - DR_{min}) + DR_{min}$.

11. The tactile stimulation device of claim 2, wherein:
the first to third outputs are determined logarithmically corresponding to the first to third distances, respectively.

12. The tactile stimulation device of claim 11, wherein:
the control unit controls the first actuator with the first pulse width modulation (PWM) signal having the first duty ratio corresponding to the first output, controls the second actuator with the second PWM signal having the second duty ratio corresponding to the second output, and controls the third actuator with the third PWM signal having the third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, the reference distance is $d_{ref}$, a first log scale factor is s1, and a second log scale factor is s2, dl1, dl2, and dl3 are determined according to equations below, $dl1 = (d_{ref} - d4)*(s2 - s1) + s1$, $dl2 = (d_{ref} - d5)*(s2 - s1) + s1$, $dl3 = (d_{ref} - d6)*(s2 - s1) + s1$, $DR_1$ which is the first duty ratio is determined according to an equation below, $$DR_1 = \frac{\log_{10}\frac{dl1}{s1}}{\log_{10}\frac{s2}{s1}} * (DR_{max} - DR_{min}) + DR_{min}$$

$DR_2$ which is the second duty ratio is determined according to an equation below, and $$DR_2 = \frac{\log_{10}\frac{dl2}{s1}}{\log_{10}\frac{s2}{s1}} * (DR_{max} - DR_{min}) + DR_{min}$$

$DR_3$ which is the third duty ratio is determined according to an equation below $$DR_3 = \frac{\log_{10}\frac{dl3}{s1}}{\log_{10}\frac{s2}{s1}} * (DR_{max} - DR_{min}) + DR_{min}.$$

13. The tactile stimulation device of claim 1, wherein: the control unit determines a first output of the first actuator according to a first distance between the target position and the first vertex, determines a second output of the second actuator according to a second distance between the target position and the second vertex, and determines a third output of the third actuator according to a third distance between the target position and the third vertex.

14. The tactile stimulation device of claim 13, wherein: the first to third outputs are determined to linearly correspond to the first to third distances, respectively.

15. The tactile stimulation device of claim 14, wherein: the control unit controls the first actuator with a first pulse width modulation (PWM) signal having a first duty ratio corresponding to the first output, controls the second actuator with a second PWM signal having a second duty ratio corresponding to the second output, and controls the third actuator with a third PWM signal having a third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, and a reference distance is $d_{ref}$, $DR_1$ which is the first duty ratio is determined according to an equation below, $$DR_1 = (d_{ref}-d1)*(DR_{max}-DR_{min})+DR_{min}$$

$DR_2$ which is the second duty ratio is determined according to an equation below, and $$DR_2 = (d_{ref}-d2)*(DR_{max}-DR_{min})+DR_{min}$$

$DR_3$ which is the third duty ratio is determined according to an equation below $$DR_3 = (d_{ref}-d3)*(DR_{max}-DR_{min})+DR_{min}.$$

16. The tactile stimulation device of claim 13, wherein: the first to third outputs are determined to logarithmically correspond to the first to third distances, respectively.

17. The tactile stimulation device of claim 16, wherein: the control unit controls the first actuator with the first pulse width modulation (PWM) signal having the first duty ratio corresponding to the first output, controls the second actuator with the second PWM signal having the second duty ratio corresponding to the second output, and controls the third actuator with the third PWM signal having the third duty ratio corresponding to the third output, and when the first to third duty ratios are a first reference duty ratio or more and a second reference duty ratio or less, and the first reference duty ratio is $DR_{min}$, the second reference duty ratio is $DR_{max}$, the fourth distance is d4, the fifth distance is d5, the sixth distance is d6, the reference distance is $d_{ref}$, a first log scale factor is s1, and a second log scale factor is s2, dl1, dl2, and dl3 are determined according to equations below, $$dl1=(d_{ref}-d1)*(s2-s1)+s1$$

$$dl2=(d_{ref}-d2)*(s2-s1)+s1$$

$$dl3=(d_{ref}-d3)*(s2-s1)+s1$$

$DR_1$ which is the first duty ratio is determined according to an equation below, $$DR_1 = \frac{\log_{10}\frac{dl1}{s1}}{\log_{10}\frac{s2}{s1}} * (DR_{max} - DR_{min}) + DR_{min}$$

$DR_2$ which is the second duty ratio is determined according to an equation below, and $$DR_2 = \frac{\log_{10}\frac{dl2}{s1}}{\log_{10}\frac{s2}{s1}} * (DR_{max} - DR_{min}) + DR_{min}$$

$DR_3$ which is the third duty ratio is determined according to an equation below $$DR_3 = \frac{\log_{10}\frac{dl3}{s1}}{\log_{10}\frac{s2}{s1}} * (DR_{max} - DR_{min}) + DR_{min}.$$

18. The tactile stimulation device of claim 13, wherein: when the target position exists on any one side of the triangle, the control unit creates the tactile stimulus at the target position by driving two actuators included the one side among the first to third actuators.

19. The tactile stimulation device of claim 13, wherein: the first to third actuators are simultaneously driven to create the tactile stimulus at the target position.

20. The tactile stimulation device of claim 13, further comprising:
a substrate in which the first to third actuators are disposed, wherein the first to third actuators are vibration motors and the first to third outputs are first to third vibration magnitudes.

* * * * *